US012769674B2

(12) United States Patent
Smith et al.

(10) Patent No.: US 12,769,674 B2
(45) Date of Patent: Oct. 20, 2026

(54) DYNAMIC PRECISION CONTROL SYSTEM FOR PERIPHERAL DATA OUTPUT WITH RESISTIVE SENSORS

(71) Applicants: Crystal Smith, Bellevue, WA (US); Alejandro Ricardo Patino, Bellevue, WA (US); David Macias Ibarra, Chandler, AZ (US)

(72) Inventors: Crystal Smith, Bellevue, WA (US); Alejandro Ricardo Patino, Bellevue, WA (US); David Macias Ibarra, Chandler, AZ (US)

( * ) Notice: Subject to any disclaimer, the term of this patent is extended or adjusted under 35 U.S.C. 154(b) by 36 days.

(21) Appl. No.: 18/896,686

(22) Filed: Sep. 25, 2024

(65) Prior Publication Data

US 2025/0103515 A1 Mar. 27, 2025

Related U.S. Application Data

(60) Provisional application No. 63/585,568, filed on Sep. 26, 2023.

(51) Int. Cl.
*G06F 13/10* (2006.01)

(52) U.S. Cl.
CPC .......... *G06F 13/10* (2013.01); *G06F 2213/40* (2013.01)

(58) Field of Classification Search
None
See application file for complete search history.

(56) References Cited

U.S. PATENT DOCUMENTS

| | | | | |
|---|---|---|---|---|
| 6,911,916 B1 * | 6/2005 | Wang | A61B 18/00 | 340/3.7 |
| 7,413,565 B2 * | 8/2008 | Wang | A61B 34/75 | 606/1 |
| 9,395,780 B2 * | 7/2016 | Considine | G06F 1/266 | |
| 11,971,837 B2 * | 4/2024 | Liu | G06F 13/404 | |
| 2003/0135203 A1 * | 7/2003 | Wang | A61B 34/30 | 606/1 |
| 2011/0004124 A1 * | 1/2011 | Lessar | A61N 1/3758 | 600/587 |

(Continued)

*Primary Examiner* — Henry Tsai
*Assistant Examiner* — Christopher A Bartels
(74) *Attorney, Agent, or Firm* — Marcos Eduardo Garciaacosta

(57) ABSTRACT

A Computing based control system for managing signals from a variety of input devices equipped with sensors, such as resistive potentiometers pedals, load cell buttons, pressure sensitive, optical, capacitive, magnetic, voice activated, proximity, sonar and other types of sensors or I/O devices. The system comprises of at least one Hub or electronic control system including one or more processing units, memory units for storing instructions and saving data, and other components such as long-term storage devices, display units, networking, interfaces and more, with the system receiving information from the sensors, processing inputs and dynamically adjusting a range of control parameters, including but not limited to cursor speed and DPI settings. The system can communicate multi-directionally with multiple peripherals, allowing real-time customization and refinement of settings and output characteristics for sensor devices. System can be configured as standalone external hub or integrated within the sensor devices or peripherals incorporating software-based controls.

11 Claims, 13 Drawing Sheets

(56) References Cited

U.S. PATENT DOCUMENTS

| | | | | |
|---|---|---|---|---|
| 2022/0104822 | A1* | 4/2022 | Shelton, IV | A61B 34/10 |
| 2023/0146947 | A1* | 5/2023 | Shelton, IV | A61B 17/1285<br>606/144 |
| 2024/0252267 | A1* | 8/2024 | Rabindran | B25J 9/104 |
| 2024/0407963 | A1* | 12/2024 | Mansfield | A61G 3/0245 |

* cited by examiner

Fig. 10 (ITEM 0930)

*Fig. 11* (ITEM 0931)

DYNAMIC PRECISION CONTROL SYSTEM FOR PERIPHERAL DATA OUTPUT WITH RESISTIVE SENSORS

FIELD OF THE INVENTION

The present invention pertains to the field of input devices and digital controls, with a focus on real-time adjustments of sensitivity and precision. Input devices can be of a mechanical, electromechanical, electrical, or electronic nature such as resistive sensors, capacitive, magnetic, pressure, optical and more, the sensed parameters are converted to electrical signals that are communicated to the main system using a wired or wireless set up. It has utility in various applications including, but not limited to, computer systems, gaming environments, graphical design software, drone control, general robotics, robotic surgery, remote control of equipment and other digital control systems where input sensors can be used and refined sensitivity is essential.

BACKGROUND INFORMATION

In specialized applications such as precision gaming, computer-aided design (CAD), graphic design, users often require instantaneous and finely-granular adjustments to input devices sensitivity such as an electronic mouse. Additionally, similar needs for sensitivity adjustments are prevalent in the use of digital stylus pens, game console controllers, drone control, joysticks, and surgery robot control among other uses. Existing solutions typically involve digital sliders, predefined stages, or multi-directional cycles for setting adjustments. Unfortunately, these solutions are non-real-time and necessitate users to pause between interactions, which can be particularly disruptive. These existing mechanisms demand manual, finger-based interactions that can interfere with in-game or in-application actions and hamper reaction speed. For instance, when using game controllers with PC games, a feature like focus aiming, which is activated by pressing the left trigger, requires refined control and real-time adjustments. However, this focus aiming typically only provides a pre-defined single stage of sensitivity, highlighting the need for more granular control options.

Problem

The limitations of prior solutions are evident as they often involve discrete settings, necessitate software-based adjustments, and rely heavily on manual, user, finger-based interactions. This methodology is non-real-time and requires users to stop between interactions, which is particularly detrimental for those who need to maintain their workflow, such as gamers, graphic designers, robotic/drone operators, and surgeons using robotic controls among others. As such, there is a significant need for more seamless, real-time adjustments to input device sensitivity to better accommodate the needs of these users.

Solution

The invention employs a range of sensors, including but not limited to analog and digital sensors as modifier inputs for real-time adjustments of sensitivity for various devices including but not limited to computer mice, digital stylus pens, game controllers, drones, or surgical robots. These modifier inputs can be of a mechanical, electric, magnetic or optical nature, using potentiometers, capacitive and other type of sensors. These modifier inputs can be actuated by users or by automatic sensing user inputs through a variety of external devices such as foot pedals, elbow rests, mice, or even voice-activated controls, providing a versatile solution. This innovative approach frees the user's hands for primary interactions while offering higher levels of control in various applications. This invention is not limited to the applications mentioned, and can be adapted for use in a variety of other fields requiring real-time sensitivity adjustments from sensor inputs.

SUMMARY OF THE INVENTION

This invention allows users to dynamically adjust the sensitivity settings of peripheral, or input/output devices and other controls through an integrated system. This system uses a variety of sensors and modifier peripherals to capture users' actions, converting them into signals transmitted to and processed in real-time by one or several dedicated computing units. The result is a seamless, iterative process for continuous fine-tuning, offering unparalleled levels of control and precision in interactions with computer systems, software applications, gaming environments, equipment remote control, drones, and robotic surgical systems. The versatility of this invention allows for its application in a wide range of fields beyond those explicitly noted.

OBJECTIVES OF THE INVENTION

The invention aims to address the limitations of existing technologies by:

1. Enabling real-time, continuous adjustments to input sensitivity for various devices including computer mice, digital stylus pens, game controllers, drones, and surgical robots among others. While the application for mouse cursor control is illustrative, the invention is not limited to this example and can be applied broadly to various control and input/output systems.
2. Allowing dynamic modification of cursor speed in various axis.
3. Minimizing the necessity for finger-based or manual adjustments.
4. Utilizing a range of sensors of an analog or digital nature for improved accuracy and adaptability.
5. Providing a system compatible with various computer, gaming setups, as well as other applications requiring refined control.

Definitions

Input Peripherals

An "input peripheral" refers to any device or apparatus that is designed to provide user-generated or automatic data to a computer or other processing unit. Input peripherals are used for tasks like pointing, clicking, typing, and other forms of data entry or command issuance. These devices can be analog or digital although they connect to a computer or processing unit via various types of interfaces mainly digital such as USB, Bluetooth, or other wired or wireless connections. The input peripheral can capture input signals via resistive, pressure, capacitive, magnetic, sound, optical, mechanic or any other kind of sensors. The input is eventually converted to electric signals that can be transmitted via wire or wireless methods to a computing system for processing, output generation and display.

Examples of input peripherals include, but are not limited to, mice, keyboards, touchpads, styluses, joysticks, game controllers, microphones, webcams, proximity sensors, biometric scanners and more.

Primary Peripheral

A "primary peripheral" refers to the main input peripheral or device with which a user directly interacts with to control a computing system, gaming environment, or software application among other uses. These include but are not limited to a computer mouse, keyboard, joystick, or any other primary input peripherals or devices. The primary peripheral works in conjunction with one or more modifier devices or modifier peripherals to offer real-time, dynamic control parameter adjustments based on user inputs.

Modifier Device/Modifier Peripheral

A "modifier device" or "modifier peripheral" refers to any input peripheral or standalone device equipped with one or more sensors. These devices are designed to capture user inputs for the purpose of adjusting, modifying, or customizing the control parameters or characteristics of another primary input peripheral in real-time. Modifier devices of existing or future technology can include, but are not limited to, foot pedals equipped with potentiometers, touch screens, load cell buttons, haptic feedback devices, voice recognition systems, neural interfaces, AR or VR peripherals, wearable devices, and gesture recognition devices among others.

BRIEF DESCRIPTION OF THE DRAWINGS

The accompanying drawings illustrate several embodiments of the invention and serve to explain the principles of the invention. These depicted embodiments and figures are not exhaustive and do not limit the scope of the invention.

DETAILED DESCRIPTION

Figure 1:
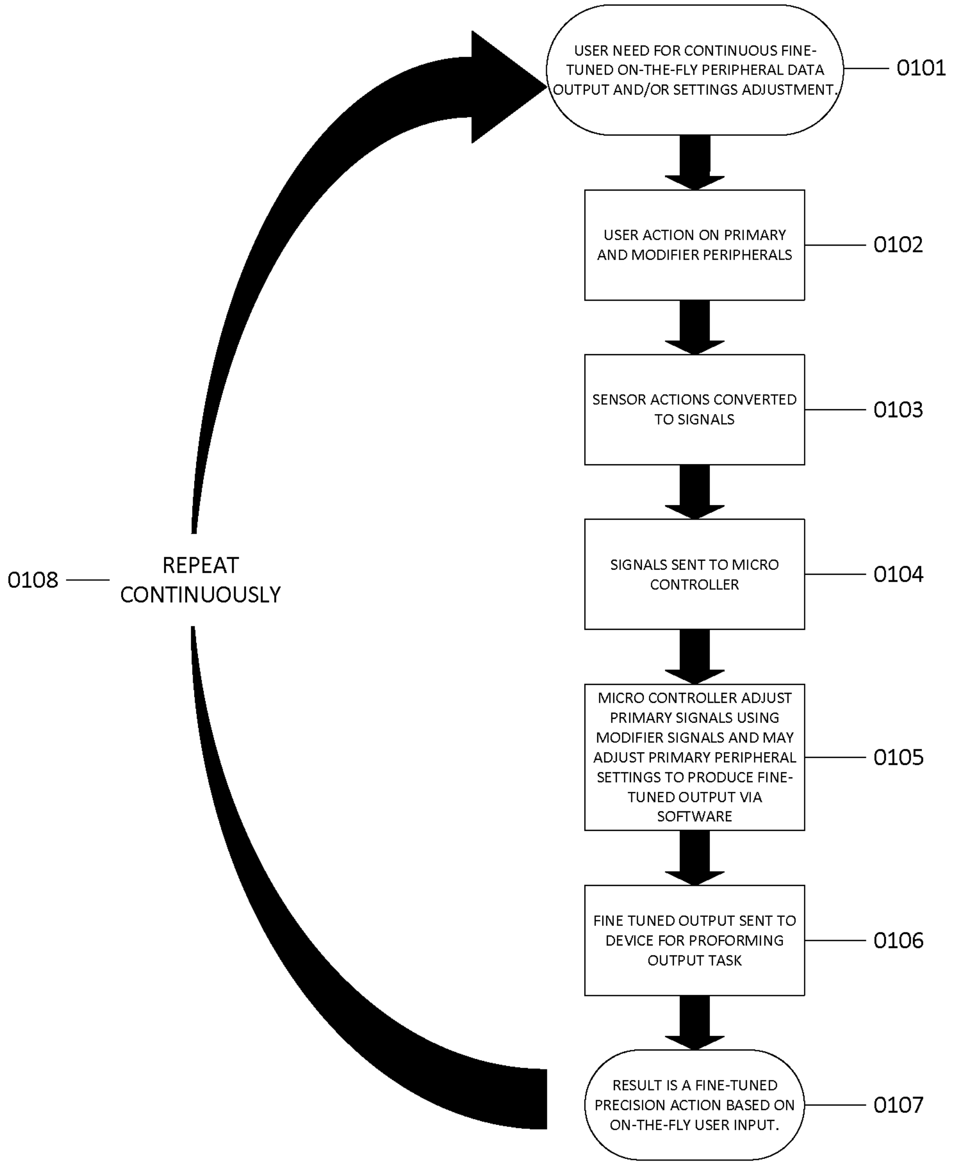
FIG. 1: Flow for Dynamic Data Processing Through System: This figure presents a flowchart outlining the sequential process from capturing user movements via sensors, translating to signals, sending to main system, to translating these into adjustments for peripheral sensitivity and cursor speed.

Example for Dynamic Data Processing Through System, FIG. 1

Step 1: User Interaction with Peripherals ((0102) The process commences by recognizing the user's need for precise and dynamic adjustments to peripheral data output and settings (0101). The user actively engages with both primary and modifier peripherals, initiating actions and adjustments that exert influence over the system's output (0102). These interactions may include inputs from input peripherals and modifier peripherals.

Step 2: Conversion of User Actions to Signals ((0103) The actions executed by the user on the input peripherals and modifier peripherals are promptly detected and translated into electrical or digital signals (0103). These signals, representing user intentions, are then poised for further processing within the system.

Step 3: Transmission to Microcontroller ((0104) The generated signals are promptly conveyed to the system's microcontroller, serving as the central hub processing unit (0104). Within the microcontroller, these signals are received, processed, and managed as input data. The microcontroller plays a pivotal role in orchestrating the subsequent stages of the process.

Step 4: Refinement of Input Signals (0105) A pivotal juncture is reached in this step. The microcontroller, driven by the refined input signals, undertakes the task of enhancing the accuracy and precision of the primary input signals. This refinement process incorporates modifier signals obtained from user actions (0105). Additionally, the microcontroller has the option to fine-tune settings of primary peripherals, if needed, to achieve the desired output performance.

Step 5: Forwarding of Fine-Tuned Output (0106) The output of the microcontroller, finely tuned and optimized through the iterative process, is transmitted to the designated device competent in executing the intended output task (0106). Leveraging the benefits of the refined signals, this device achieves the task with an enhanced level of precision and accuracy.

Step 6: Culmination and Ongoing Iteration (0107 and 0108) As the process reaches its conclusion, the outcome manifests a precision action, intimately aligned with real-time user input and any adaptations facilitated by the system (0107). This sequence of steps is designed to operate seamlessly and perpetually, accommodating continuous adjustments and output tasks rooted in the evolving user input (0108).

Figure 2:
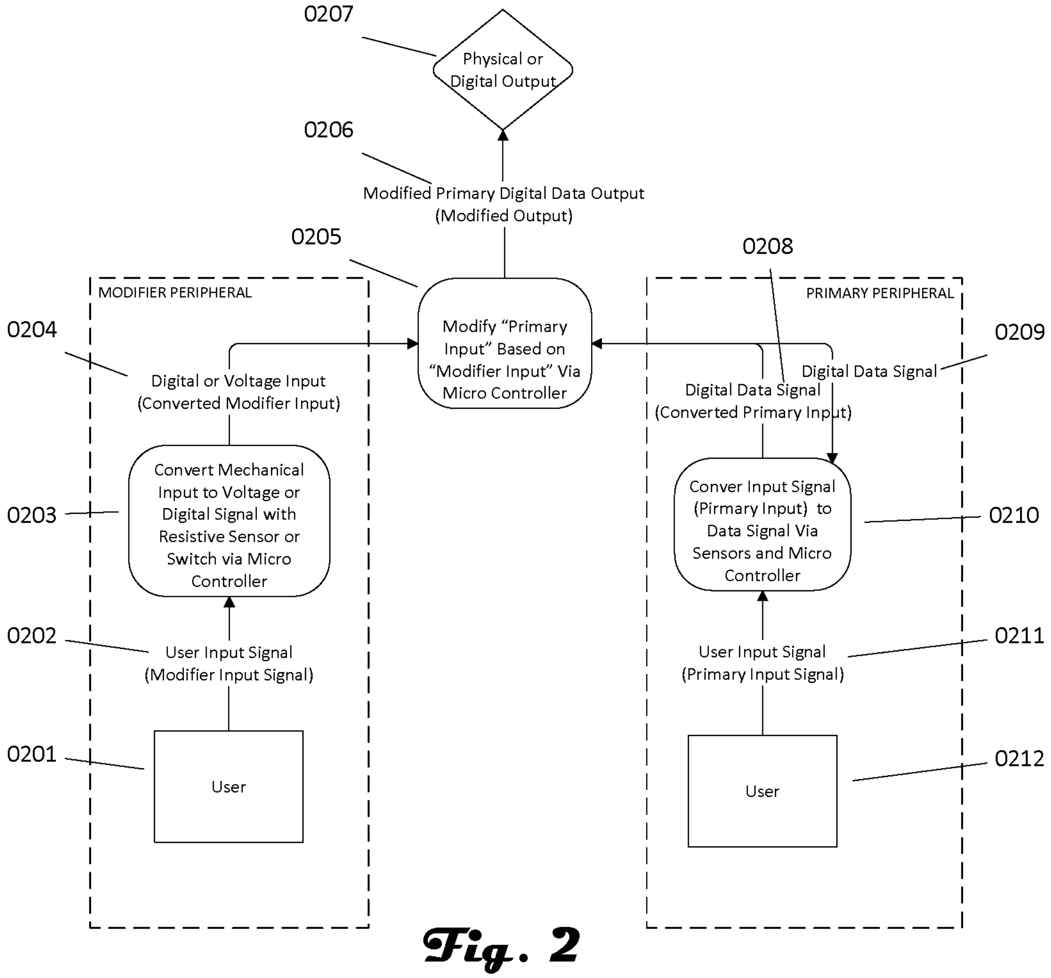
FIG. 2, System Description for a Single Modifier and Single Primary Input System: This figure is a flow diagram showcasing a user providing modifier and primary inputs. These inputs can be captured through sensors and processed via a computing unit to generate a modified digital or physical outcome.

Dynamic Signal Modification System Data Flow, FIG. 2

User Input Collection ((0201 & 0212): The system begins with two distinct user inputs. User ((0201) provides a "modifier input signal" (0202), while User (0212) provides what is referred to as a "primary input signal" (0211).

Conversion of User Inputs a. Modifier Input to Voltage or Optionally Digital Signal (0203 & 0204): The modifier input signal (0202) undergoes conversion into a voltage or optionally digital signal referred to as "converted modifier input". This conversion can be facilitated by a resistive sensor (0204) and optionally a microcontroller, transforming the original modifier input to an analog or optionally digital format. This signal (0202) represents a command to the main system of what level of precision is needed for the system.

b. Primary Input to Digital Signal (0210 & 0208): The primary input signal (0211) is converted into a digital signal. This conversion utilizes a combination of sensors and a microcontroller, represented by item 0208 this is referred to as "converted primary input". The resultant digital representation retains the characteristics of the primary input. Typically, primary inputs are captured via a mouse or other primary device for controlling the main system inputs.

Microcontroller Processing (0205): Both the "converted modifier input", now in voltage or optionally digital form (0204), and the digital representation of the "converted primary input" (0208), are sent to a central microcontroller. Within this microcontroller, a specific processing step, identified as 0205, takes place. Here, the primary input (0208) is dynamically processed based on the information derived from the voltage or optionally digital representation of the modifier input (0204).

Output Generation (0206, 0207, 0209): The resultant data, post-modification, is classified as "Modified Primary Digital Data Output" (0206). This data is then forwarded to a final processor, tasked with generating either a physical or digital output, as denoted by item 0207. The nature of this output can be varied, depending on the end application of the system. As an option, in lieu or in addition to the main output feedback signal (0209) is dispatched from the microcontroller (0205) to the primary input conversion unit (0210) to adjust peripheral settings.

In one of the proposed embodiments, as a remote control operation, such as tele surgery, (0204) can be a signal generated by the user, or somebody else, via a sensor device, such as a pedal, a slider, or some other physical, analog or digital input, and (0208) can be the joy stick controlling the movement of a device via a robotic unit (needle, camera, etc), where the signal generated by (0204) in combination with (0208) can slow down or speed up the movement of the unit being controlled based on conditions observed by the users. A telesurgery environment envisions the presence of different actors where each is monitoring or acting on different parameters real time, and providing input to the main system.

Figure 3:
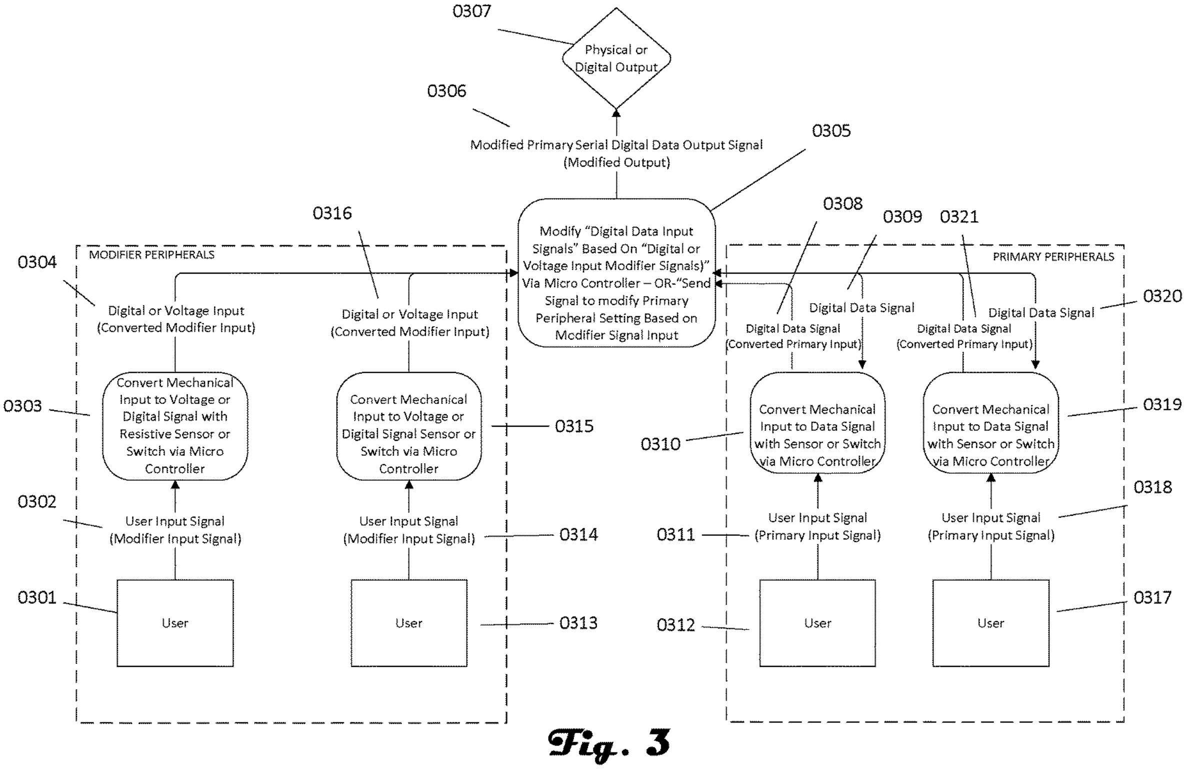
FIG. 3, System Description for a Dual Modifier and Dual Primary Input System: This figure illustrates a flow diagram of a multi-input system where users supply dual or multiple modifier and dual or multiple primary inputs. These are channeled through distinct sensors and a central microcontroller, resulting in a digital or physical outcome. Notably, while this embodiment demonstrates a dual input setup, it signifies that both the modifier and primary inputs can be scaled to accommodate an unlimited number.

System Description for a Dual Modifier and Dual Primary Input System, FIG. 3

Dual Modifier and Dual Primary User Input Collection

User (0301) provides a first "modifier input signal" (0302). User (0313) offers a second "modifier input signal" (0314). User (0312) provides a first "primary input signal" (0311). User (0317) delivers a second "primary input signal" (0318).

Conversion of Modifier User Inputs a. First Modifier Input to Voltage/Digital Signal: The first modifier input signal (0302) undergoes conversion via the mechanism (0303), producing either a voltage or a digital signal known as the first "converted modifier input" (0304).

b. Second Modifier Input to Voltage/Digital Signal: The second modifier input signal (0314) is converted via the mechanism (0315), resulting in either a voltage or a digital signal labeled the second "converted modifier input" (0316).

Conversion of Primary User Inputs a. First Primary Input to Digital Signal: The first primary input signal (0311) is converted using a system component (0310), producing the "converted primary Input" (0308).

b. Second Primary Input to Digital Signal: The second primary input signal (0318) is transformed with the assistance of another system component (0319), generating a second "converted primary input" (0321).

Central Microcontroller for Data Integration and Processing

The microcontroller (0305) receives all four processed inputs: first converted modifier signal (0304), second converted modifier signal (0316), first converted primary digital signal (0308), and the second converted primary digital signal (0321).

Within the microcontroller (0305), a unique algorithm processes the two primary signals dynamically, modifying them based on the information from the two converted modifier signals.

If needed, feedback signals (0309 and 0320) are dispatched from the microcontroller (0305) to the primary input conversion units (0310 and 0319) to adjust peripheral settings or input interpretation.

Generation of System Output

Post-processing, the microcontroller (0305) delivers a "Modified Primary Digital Data Output" (0306).

This output (0307) can be routed to various end systems, both physical, electric, acoustic, sound, analog or digital, to produce the desired response or functionality based on the multi-input system's design and objective.

An embodiment representing multiple modifier peripherals and primary inputs could be represented by a team playing an online game, or controlling a complex machine, such as a robot, where different members are monitoring different parameters, and proving input to the main system, while several other key operators are running the operation, and the system automatically modifies their signals and send an output command or signal to the device being controlled.

Figure 4:
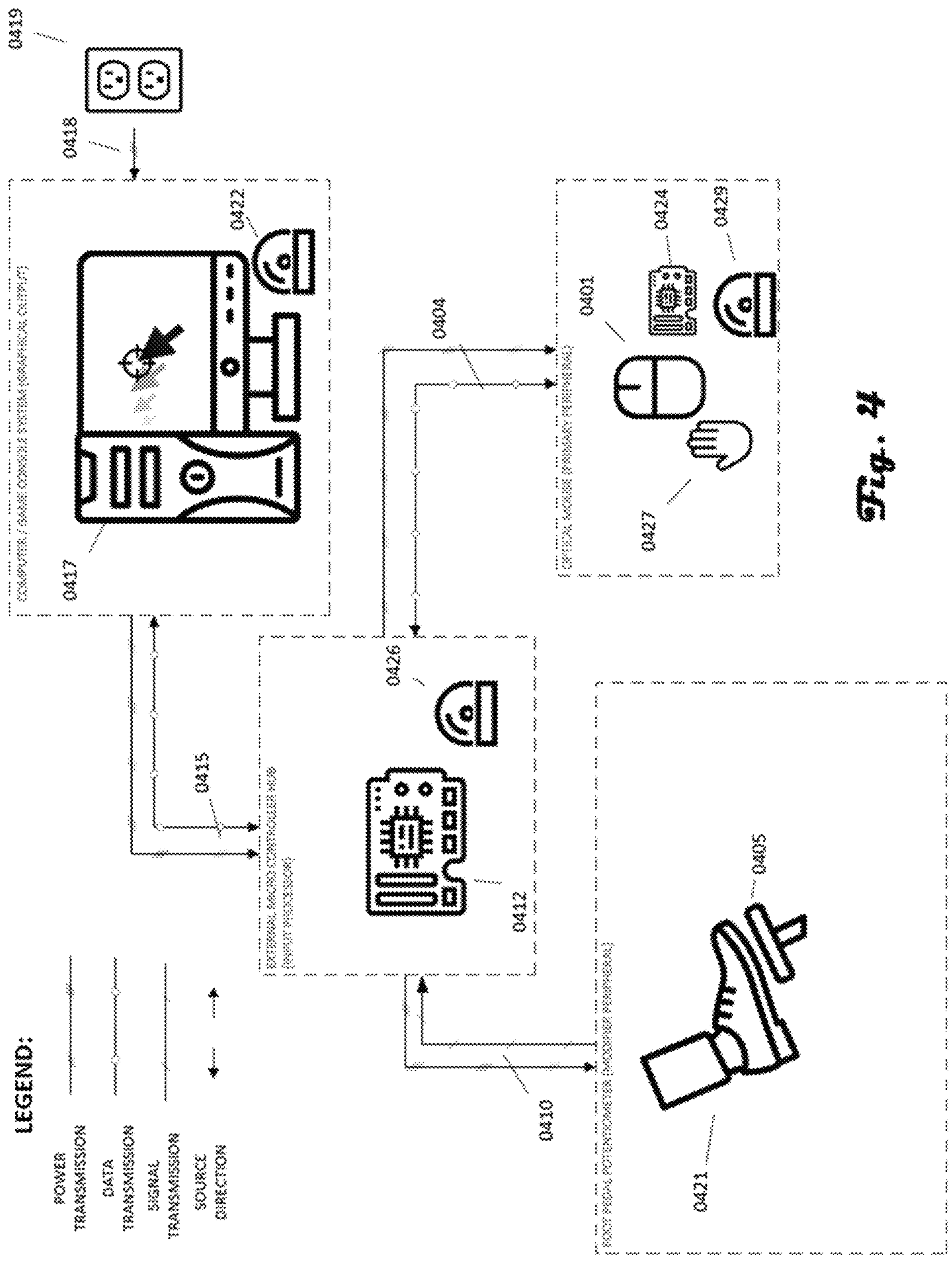
FIG. 4, System Embodiment 1: This figure provides an overview of the entire system, depicting the connections between the computer, the peripheral device (e.g., a mouse), and the sensor, including analog potentiometer. In this embodiment, an external microcontroller (0412) serves as the central hub.

System Embodiment 1, FIG. 4

System Overview: The Enhanced Control System integrates an External Microcontroller Hub (0412) to process inputs from both the Optical Mouse (0401) and the Potentiometer Foot Pedal (0405), aiming to refine cursor precision for example. The mouse captures movements, while the foot pedal gauges user force input.

Both data streams are channeled to the hub, which fine-tunes cursor responses under the guidance of the Computer or Game Console (0417).

Microcontroller Hub (0412): For this embodiment at the core of the Enhanced Control System is the Microcontroller Hub (0412), powered by the Computer/Game Console (0417). This hub serves as the central control unit, managing inputs and outputs within the system. It receives X and Y movement data from the Optical Mouse (0401) through the 1/0 Mouse Cable (0404) and voltage signals from the Potentiometer Foot Pedal (0405) via the 1/0 Foot Pedal Cable (0410). The Microcontroller Hub processes these inputs through the Microcontroller Hub Software (0426), finely adjusting pointer coordinates based on user input (0421) via the Potentiometer Foot Pedal (0405). Additionally, the hub also serves as a pass-through for mouse data, ensuring typical mouse functionalities. The bidirectional communication with the Computer/Game Console (0417) allows for the update of Microcontroller software (0426), optimization of mouse settings, and adjustments to foot pedal input data. The Microcontroller Hub (0412) produces the "Modified Primary Digital Data Output".

Optical Mouse (0401): The Optical Mouse converts X and Y movements captured by User Hand (0427) through its optical sensor into digital signals via the Optical Mouse Microcontroller (0424). These signals are then sent through the 1/0 Mouse Cable (0404) to the Microcontroller Hub (0412). The Micro Controller Hub actively processes and fine-tunes the X and Y pointer coordinates based on user input from the Potentiometer Foot Pedal (0405), resulting in enhanced mouse pointer precision. The DPI adjustments via data input from the External Microcontroller Hub (0412) can be optional and can be configured based on user preferences through Optical Mouse Microcontroller Software (0429). The Optical Mouse (0401) produces the "Converted Primary Input".

Potentiometer Foot Pedal (0405): The Potentiometer Foot Pedal (0405) captures user force inputs via its analog potentiometer (not shown in the graphic, considered part of item 0405), transforming them into continuous voltage outputs. These signals are then sent to the Microcontroller Hub (0412) through the Foot Pedal Input/Output/Power Cable (0410). The Microcontroller Hub optimizes pointer coordinates and sensitivity based on foot pedal input. The Potentiometer Foot Pedal (0405) produces the "Converted Modifier Input".

Computer/Game Console Output System (0417): The Computer/Game Console (0417) functions as a supplementary processing unit and a final output graphic for a gaming embodiment for example, offering visual cursor location information and enabling software adjustments via the 1/0 Micro Controller Hub Input/Output/Power Cable (0415). The Computer Software (0422) provides downloadable code for configuring system settings and updating the External Micro Controller Hub Software (0426).

Power Supply and Connectivity: Power flows from the 120 Volt Power Outlet (0419) through the 120 Volt Outlet Power Cable (0418) to the Computer/Game Console (0417). This console powers the Micro Controller Hub (0412) via the 1/0 Microcontroller Hub Input/Output/Power Cable (0415). The Microcontroller Hub distributes power to the Optical Mouse (0401) and the Potentiometer Foot Pedal (0405) through the 1/0 Mouse Cable (0404) and the 1/0 Foot Pedal Cable (0410), respectively.

Figure 4A:
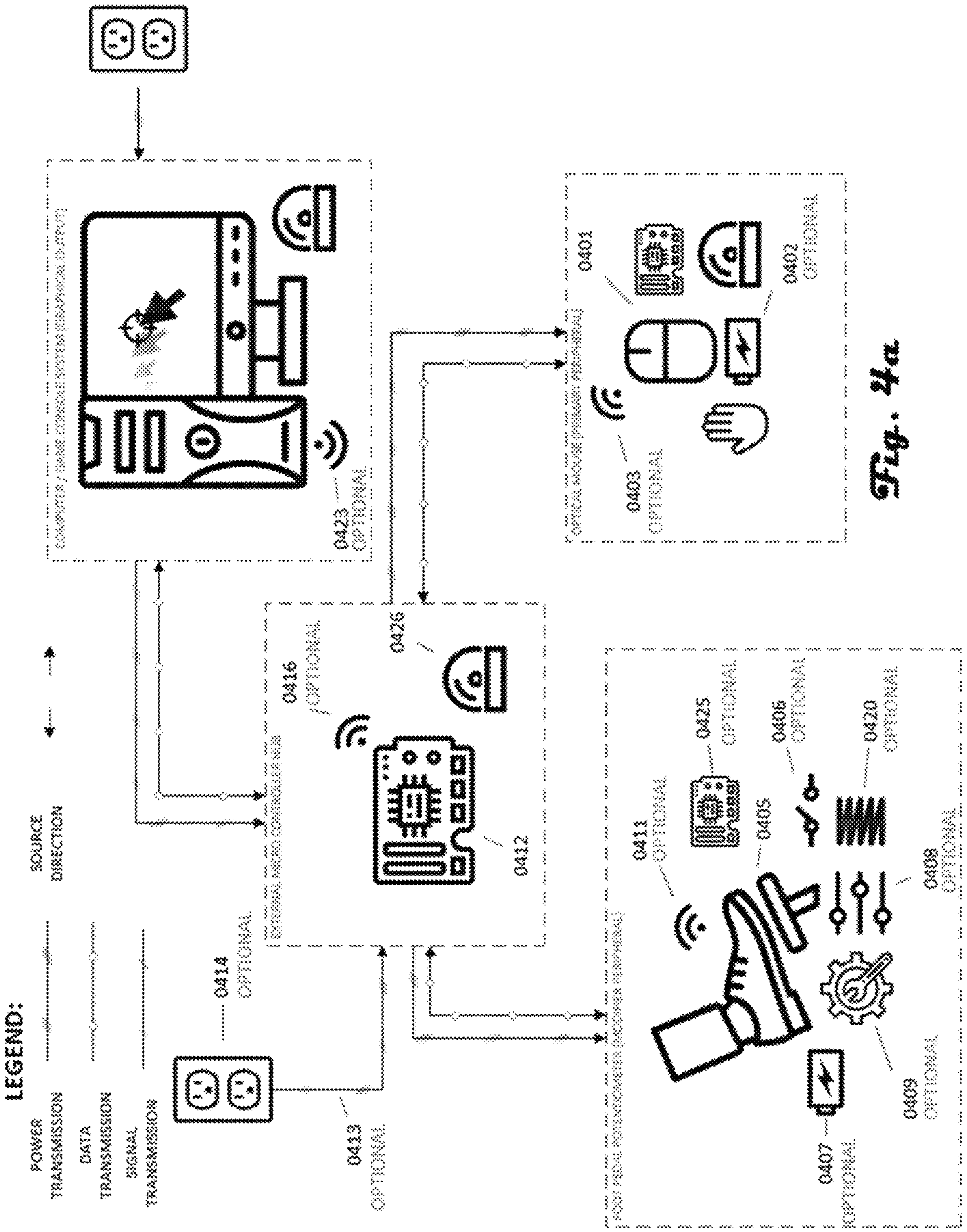

Additional Optional Components (Refer to FIG. 4*a*): Several optional components further elevate the system's functionality, providing users with enhanced control and customization:

Foot Pedal Button Switch (0406): Provides discreet on/off voltage signals. Users can activate or deactivate the pedal and toggle between preset DPI settings, providing alternative control options.

Pedal Stroke Travel Index (0409): Enables users to control pedal stroke distance for finely tuned DPI adjustments. Spring-loaded roller ball engagement and a grooved track allow users to set reference points for pedal stroke, enhancing control over pointer speed.

Foot Pedal Microcontroller (0425): Captures and processes signals from the Foot Pedal's potentiometer and optional Foot Pedal Switches or setting adjustments. Translates these inputs into optional digital outputs, enhancing the system's versatility and adaptability.

Wireless Computer Input/Output Transmitter and Receiver (0423): Facilitates wireless data transfer between the Wireless Microcontroller Hub Transmitter and Receiver (0416} and the External Microcontroller Hub Software (0426).

Wireless Foot Pedal Transmitter and Receiver (0411): Enables wireless communication between the Potentiometer Foot Pedal (0405) and the Microcontroller Hub (0412}, offering enhanced mobility and freedom.

Mouse Wireless Input/Output Transmitter and Receiver (0403): Facilitates wireless communication between the Optical Mouse (0401) and the Microcontroller Hub (0412), enhancing the user's range of movement and reducing cable clutter.

Battery (0402 for Mouse, 0407 for Potentiometer Foot Pedal): Offers portable power, enhancing the invention's adaptability within the power flow structure.

120 Volt Power Outlet (0414} through the 120 Volt Outlet Power Cable (0413) to the External Microcontroller Hub (0412).

An optional Mechanical Spring (item 0420} offers feedback resistance to the foot pedal when pressed down.

Foot Pedal Voltage Output Trim Knob (item 0108) offers enhanced control for adjusting upper voltage limits.

Figure 5:
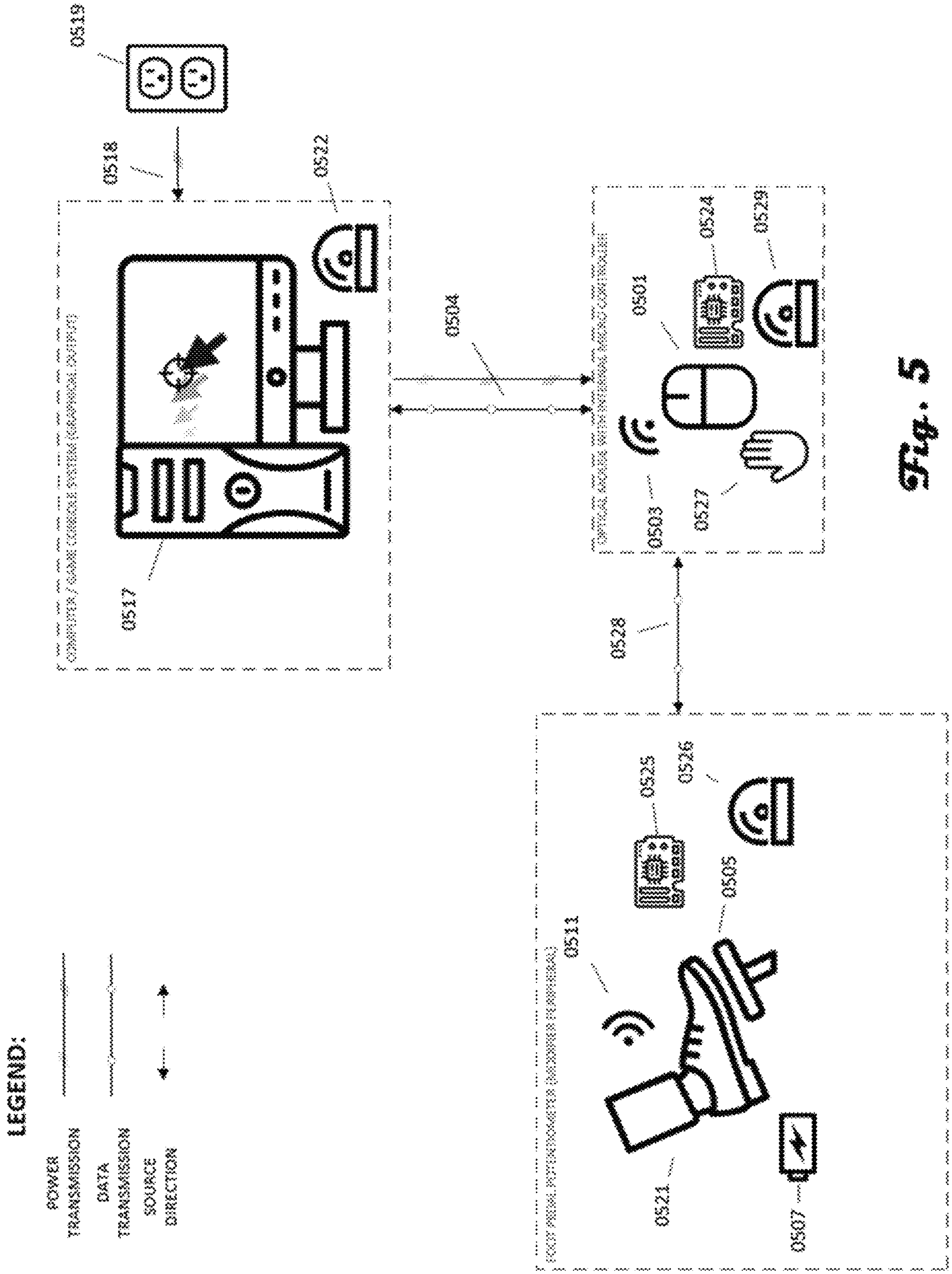
FIG. 5, System Embodiment 2: This figure showcases an alternate embodiment of Embodiment 1, where the microcontroller within the Optical Mouse (0501) serves as the central hub.

System Embodiment 2, FIG. 5

System Overview: The system in FIG. 5 integrates an Optical Mouse with an internal Micro Controller (0501) and a Wireless Potentiometer Foot Pedal (0505) with digital potentiometer. The mouse detects hand movements (0527) to guide the cursor. The foot pedal (0505), upon capturing User-Applied Force Input (0521), communicates this data directly to the mouse's Micro Controller to refine and optimize cursor movements for accuracy. The Computer/Game Console (0517) then visually displays these enhanced movements as a final output. In a multi modifier peripheral, with two pedals for example, one could be used to increase the resolution, the other to decrease it. Or they could be used to zoom in or out when working in a design, or exploring a complex 3D design for example.

Optical Mouse with Internal Microcontroller (0501): The Optical Mouse (0501) has a built-in microcontroller (0524). This internal microcontroller (0524) processes precise cursor movements in response to the user's hand motions (0527) and input from the Wireless Potentiometer Foot Pedal input signal. The mouse communicates wireless digital data (0528) via the Foot Pedal Wireless Transmitter (0511) and the Optical Mouse Wireless Receiver (0523). The refined output signal is sent to the Computer/Game Console (0517) via the Optical Mouse Input/Output Cable (0504). DPI adjustments via data input from the Foot Pedal Internal Microcontroller (0525) are optional and can be configured based on user preferences through the Optical Mouse Microcontroller Software (0529). The Optical Mouse (0501) produces both the "Converted Primary Input" and the "Modified Primary Digital Data Output".

Wireless Potentiometer Foot Pedal (0505): The Wireless Potentiometer Foot Pedal (0505) captures the User-Applied Force Input (0521) and converts it into voltage outputs via in internal potentiometer (not shown in the graphic, considered part of item 0505). These voltage outputs are then relayed to the internal Foot Pedal Microcontroller (0525), where, using the Foot Pedal Microcontroller Software (0526), they are converted to a digital output. Subsequently, this digital output is transmitted wirelessly to the Optical Mouse (0501) via the Foot Pedal Wireless Input/Output Transmitter and Receiver (0511) and the Wireless Mouse Input/Output Transmitter and Receiver (0503). The data signal exchanged between the receiver (0511) and (0503) is defined as the Foot Pedal to Mouse Wireless Data Transmission (0528). This input interacts with the Optical Mouse Internal Microcontroller (0524) to enhance cursor accuracy. The Potentiometer Foot Pedal (0505) produces the "Converted Modifier Input".

Computer/Game Console (0517): The Computer/Game Console (0517) serves as a supplementary process unit, providing visual cursor feedback and optionally adjusting mouse settings based on user input from the foot pedal. The software (0522) allows for customization, enabling tailored experiences.

Power Supply and Connectivity: Power is supplied through the 120-Volt Power Outlet (0519) and is distributed via the 120-Volt Outlet Power Cable (0518) to the Computer/Game Console (0517). The Optical Mouse Input/Output Cable (0504) powers the Optical Mouse (0501). The Wireless Potentiometer Foot Pedal (0505) is powered by an internal Foot Pedal Battery (0507).

Figure 6:
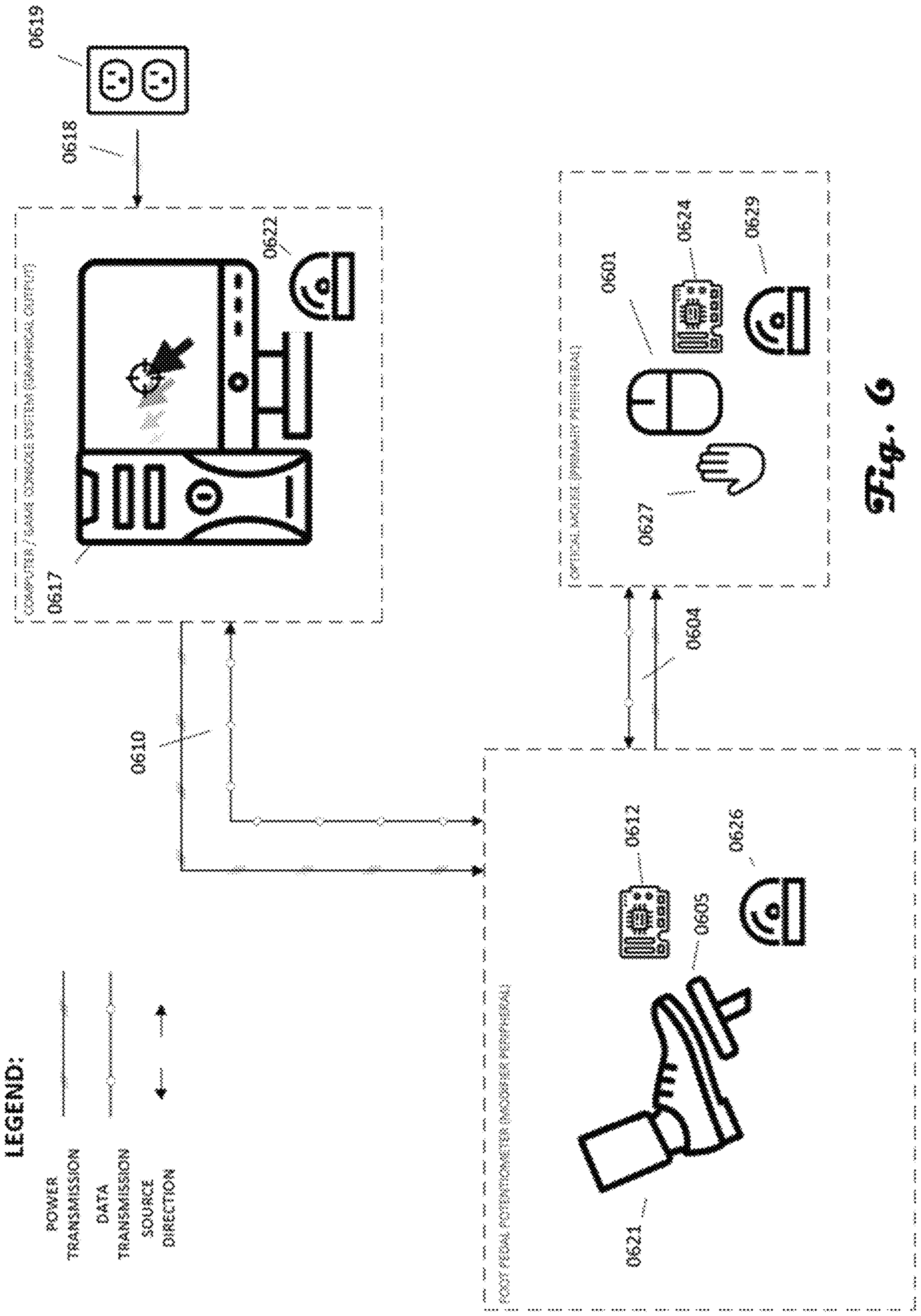
FIG. 6, System Embodiment 3: This figure portrays another alternate embodiment of Embodiment 1, with the microcontroller located within the Potentiometer Foot Pedal (0605) functioning as the central hub.

System Embodiment 3, FIG. 6

System Overview: The system in FIG. 6 integrates an Optical Mouse (0601) with a Potentiometer Foot Pedal (0605). Hand movements detected by the mouse (0601) are sent to the foot pedal (0605), where they can be modified by its internal microcontroller based on User Foot (0621) force input, before being communicated to a Computer/Game Console (0617) for display and execution.

Optical Mouse (0601): The Optical Mouse captures X and Y movements from User Hand (0627) via its optical sensor, converting them into digital signals through the Optical Mouse Internal Microcontroller (0624). These signals are sent to the Potentiometer Foot Pedal (0605) via the Optical Mouse Input/Output Cable (0604). The DPI adjustments via data input from the Foot Pedal Internal Microcontroller (0612) are optional and can be configured based on user preferences through Optical Mouse Microcontroller Software (0629). The Optical Mouse (04601) produces the "Converted Primary Input".

Potentiometer Foot Pedal (0605): The Potentiometer Foot Pedal captures force inputs by User Foot (0621) via its internal analog potentiometer (not shown in the graphic, considered part of item 0605), transforming them into continuous voltage outputs. These signals are processed by the Foot Pedal Internal Microcontroller (0612) and converted into digital data. Based on user needs, this processed data can either be sent to the Optical Mouse (0601) for DPI adjustments or be utilized by the internal Foot Pedal Microcontroller Software (0626) to fine-tune the cursor speed by adjusting X and Y coordinates. Typical Mouse data is sent to computer through foot pedal and cursor speed adjustment data is primarily sent to the Computer/Game Console (0617) through the Foot Pedal 1/0 Cable (0610). The Potentiometer Foot Pedal (0605) produces both the "Converted Modifier Input" and the "Modified Primary Digital Data Output".

Computer/Game Console Output System (0617): The Computer/Game Console functions as a supplementary processing unit and a primary output display unit. It receives inputs from the Potentiometer Foot Pedal (0605) for cursor display and pass-through mouse data for typical mouse functionalities. Software settings related to these inputs, which are managed through Computer Software (0622), are optional configurations that can be enabled or disabled based on user preferences.

Power Supply and Connectivity: Power flows from the 120 Volt Power Outlet (0619) through the 120 Volt Outlet Power Cable (0618) to the Computer/Game Console (0617). This console powers the Potentiometer Foot Pedal (0605) via the Foot Pedal 1/0 Cable (0610). The Foot Pedal then distributes power to the Optical Mouse (0601) through the Optical Mouse 1/0 Cable (0604).

Figure 7:
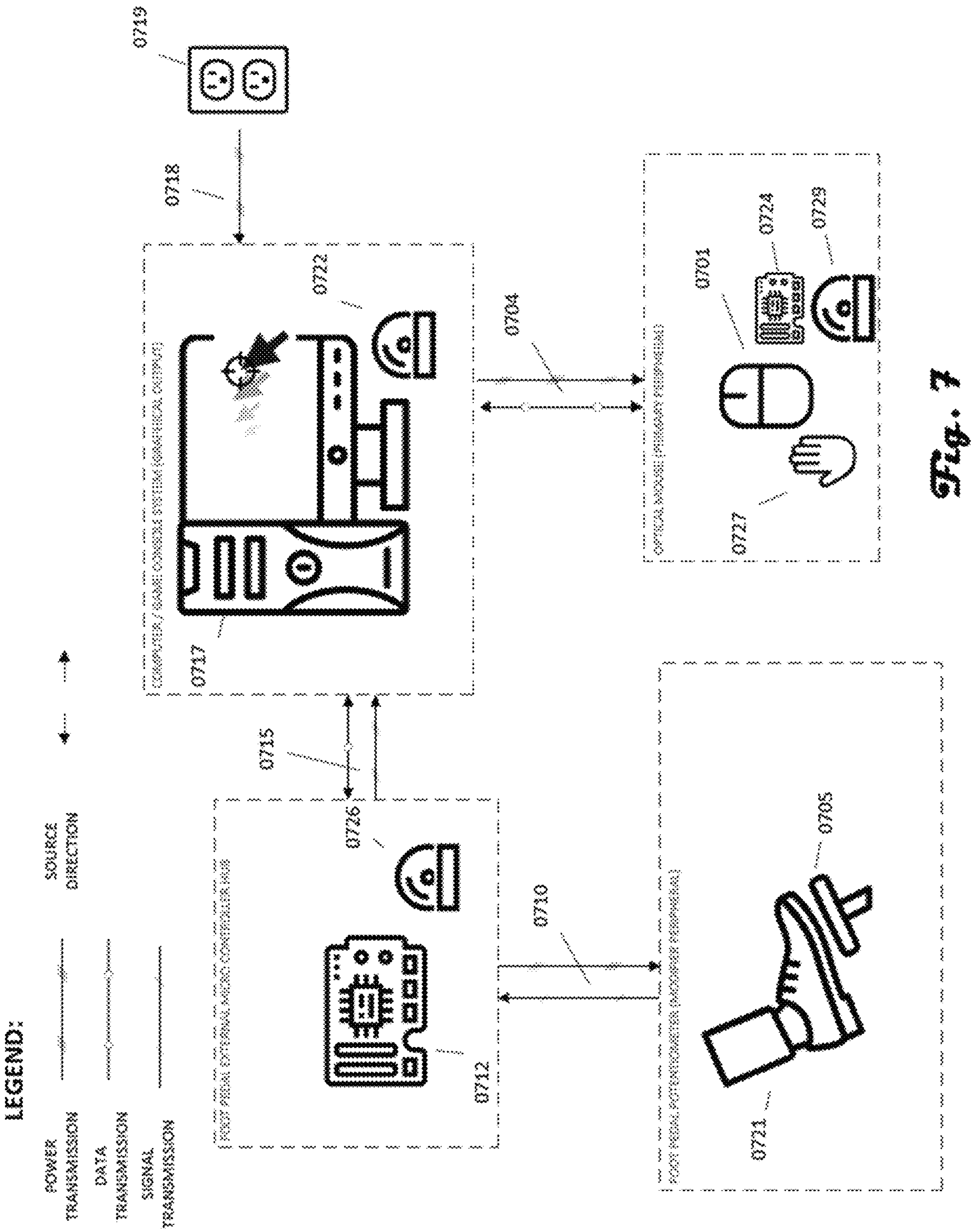
FIG. 7, System Embodiment 4: In this embodiment, the Potentiometer Foot Pedal (0705) sends a continuous signal to an external microcontroller (0712), and the Computer/Game Console (0717) acts as the central hub.

System Embodiment 4, FIG. 7

System Overview: This embodiment integrates an Optical Mouse (0701) and a Potentiometer Foot Pedal (0705) connected to an external micro controller (0712) as input devices, interfaced through a Computer/Game Console (0717). The Computer Software (0722) receives these inputs and dynamically modifies mouse data, optimizing cursor movements and DPI settings in real-time.

Optical Mouse (0701) & Associated Components: The Optical Mouse is powered by the Computer/Game Console (0717) via the Optical Mouse 1/0 Cable (0704). It captures X and Y movements from the User Hand (0727) and translates these into digital signals, which are then sent to the Computer/Game Console (0717). The Optical Mouse Internal Microcontroller (0724) optionally controls the mouse's optical sensitivity settings based on digital data received from the Computer/Game Console via the Optical Mouse 1/0 Cable (0704). The Optical Mouse Microcontroller Software (0729) allows for real-time adjustment of the mouse's DPI settings, based on inputs from the Potentiometer Foot Pedal (0705). The Optical Mouse (0701) produces the "Converted Primary Input".

Potentiometer Foot Pedal (0705) & Associated Components: The Potentiometer Foot Pedal (0705) receives power from the Microcontroller Hub (0712) and captures force input from the User Foot (0721), converting it into a continuous voltage signal via an internal potentiometer (not shown in the graphic, considered part of item 0705). The Foot Pedal External Microcontroller (0712) receives the analog voltage signal from the Potentiometer Foot Pedal and converts it into a digital output signal, which is then sent to the Computer/Game Console (0717) for further processing. The External Microcontroller Hub Software (0726) interprets the Potentiometer Foot Pedal's continuous voltage signal to adjust either the cursor speed or the mouse DPI setting real-time. The Foot Pedel External Microcontroller (0712) produces the "Converted Modifier Input".

Computer/Game Console and Software: Computer/Game Console (0717) receives and processes digital data from both the Optical Mouse and the Foot Pedal External Microcontroller (0712). It also powers these peripherals via their respective 1/0 cables. Computer Software (0722) serves as the central hub for data processing and setting adjustments. It takes input data from both the Optical Mouse (0701) and the Foot Pedal (0705) and adjusts cursor movements and DPI settings in real-time based on inputs. The Computer/Game Console System (0717) produces the "Modified Primary Digital Data Output".

Interfacing Cables and Connectivity: Power is supplied through the 120-Volt Power Outlet (0719) and is distributed via the 120-Volt Outlet Power Cable (0718) to the Computer/Game Console (0717). The Foot Pedal 1/0 Cable (0710) delivers power to the Potentiometer Foot Pedal and transmits data to and from the Foot Pedal External Microcontroller (0712). The Optical Mouse 1/0 Cable (0704) is responsible for both power and data transfer between the Optical Mouse and the Computer/Game Console (0717). The External Microcontroller 1/0 Cable (0715) delivers power and data between the Foot Pedal External Microcontroller (0712) and the Computer/Game Console (0717).

Figure 8:
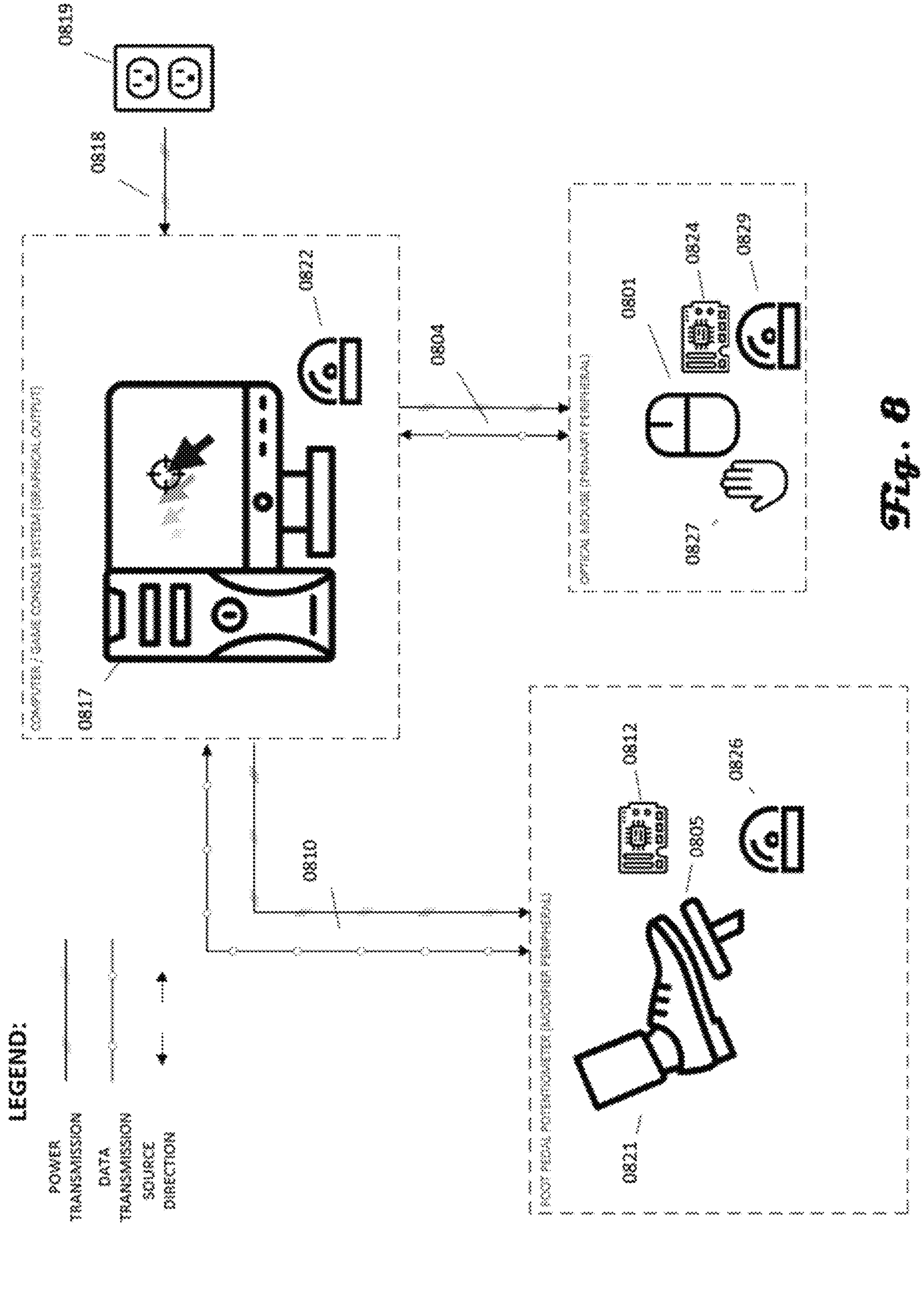
FIG. 8, System Embodiment 5: This figure represents an alternate embodiment where the Computer/Game Console (0817) serves as the central hub.

System Embodiment 5, FIG. 8

System Overview: This embodiment integrates an Optical Mouse (0801) and a Potentiometer Foot Pedal with an Internal Microcontroller (0805) as input devices, interfaced through a Computer/Game Console (0817). The system aims to offer enhanced and customizable control for gaming or computer operations.

Optical Mouse (0801) & Associated Components: The Optical Mouse (0801) is powered by the Computer/Game Console (0817) via the Optical Mouse 1/0 Cable (0804). This device captures X and Y movements from the User Hand (0827) and converts these into digital signals, which are sent to the Computer/Game Console (0817). The Optical Mouse Internal Microcontroller (0824) manages the mouse's optical sensitivity and other settings based on digital data received from the Computer/Game Console via the Optical Mouse 1/0 Cable (0804). The Optical Mouse Microcontroller Software (0829) allows for real-time adjustment of the mouse's DPI settings, based on inputs from the Potentiometer Foot Pedal (0805). The Optical Mouse (0801) produces the "Converted Primary Input".

Potentiometer Foot Pedal (0805) & Associated Components: The Potentiometer Foot Pedal with Internal Microcontroller (0805) receives power from the Computer/Game Console (0817) via the Foot Pedal 1/0 Cable (0810) and captures force input from the User Foot (0821), converting it to a digital signal through an internal potentiometer (not shown in the graphic, considered part of item 0805) and the Foot Pedal Internal Microcontroller (0812).

The Foot Pedal Internal Microcontroller Software (0826) interprets the force input signal from the Potentiometer Foot Pedal to modify either the mouse's X and Y position or the mouse DPI settings in real-time. The Potentiometer Foot Pedal (0805) produces the "Converted Modifier Input".

Computer/Game Console (0817) and Software (0822): The Computer/Game Console (0817) receives and processes digital data from both the Optical Mouse and the Potentiometer Foot Pedal, powering these peripherals via their respective 1/0 cables (0810 & 0804). Computer Software (0822) serves as the central hub for data processing and settings adjustments. It interprets input data from both the Optical Mouse (0801) and the Potentiometer Foot Pedal (0805) to adjust cursor movements and DPI settings in real-time. The Computer/Game Console System (0817) produces the "Modified Primary Digital Data Output".

Interfacing Cables and Connectivity: Power is supplied through the 120-Volt Power Outlet (0819) and distributed via the 120-Volt Outlet Power Cable (0818) to the Computer/Game Console (0817). The Foot Pedal 1/0 Cable (0810) provides power to the Potentiometer Foot Pedal and transmits data to and from the Computer/Game Console (0817). The Optical Mouse 1/0 Cable (0804) manages both power and data transfer between the Optical Mouse and the Computer/Game Console (0817).

Figure 9:
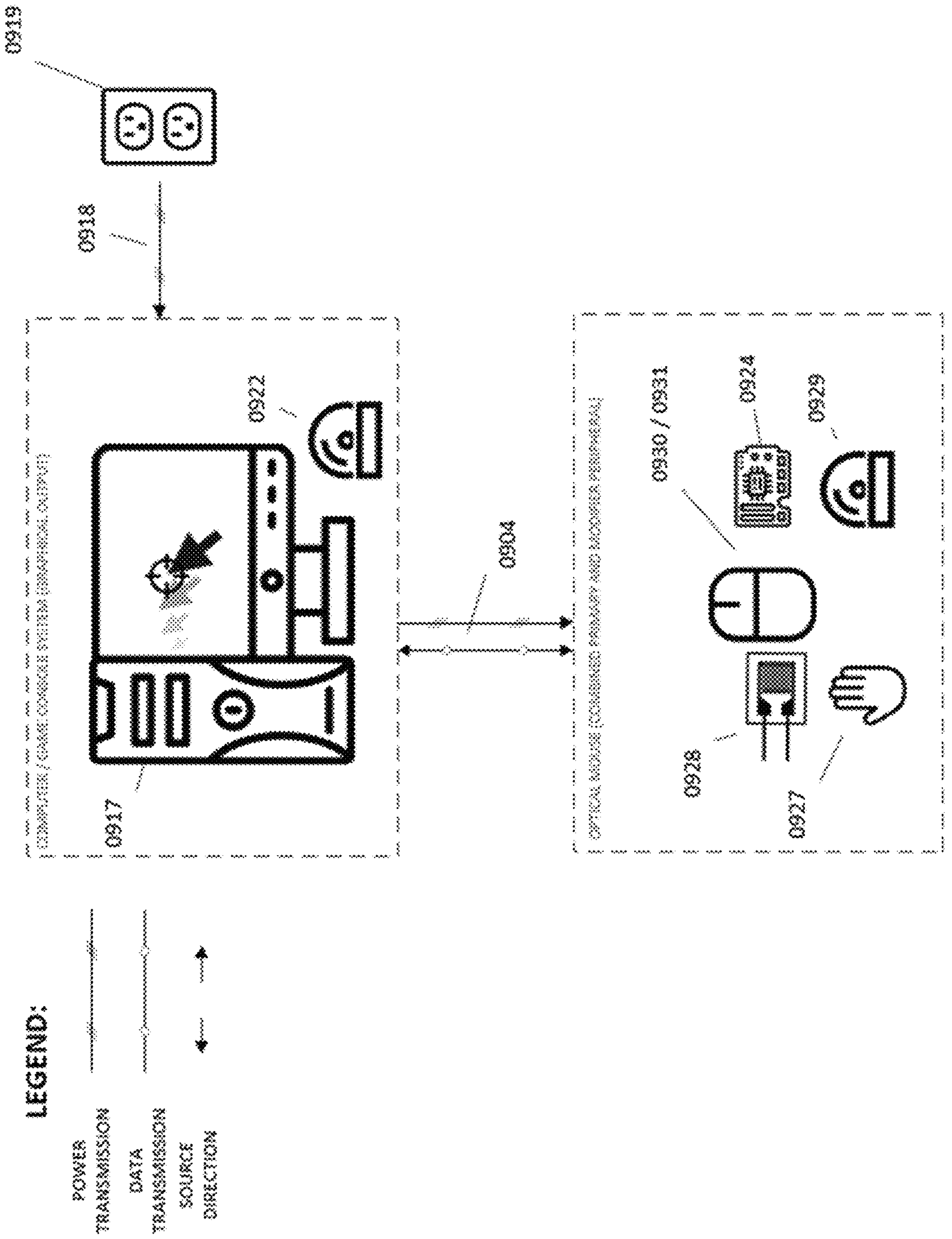
FIG. 9, System Embodiment 6: This figure illustrates an alternate embodiment where the resistive sensor (0928) is housed within the Optical Mouse, and the Optical Mouse Microcontroller (0924) operates as the central hub.

System Embodiment 6, FIG. 9

System Overview: This system aims to integrate an Optical Mouse (0930/0931) with an Internal Load Cell (0928) as pressure sensor into a Computer/Game Console (0917). The goal is to offer precise control over mouse movements and DPI settings through multiple input channels, including the internal Load Cell for real-time adjustments.

Optical Mouse (0930/0931) & Associated Components: The Optical Mouse with Internal Load Cell (0928) is powered by the Computer/Game Console (0917) via the Optical Mouse 1/0 Cable (0904). It captures X and Y movements from the User Hand (0927) and sends these as digital signals to the Computer/Game Console. Additionally, it features a Load Cell for real-time adjustments of either cursor speed or DPI settings.

The Optical Mouse Internal Load Cell (0928) detects force input from the User Hand (0927), converting it into a continuous digital output signal in real-time to adjust the mouse's DPI or, optionally, cursor speed settings.

The Optical Mouse Microcontroller Software (0929) can modify the mouse's optical settings. It is capable of receiving real-time input from the Load Cell (0928) through the Optical Mouse Internal Microcontroller (0924) to adjust either cursor speed or DPI settings. The Optical Mouse (0930/0931) produces both the "Converted Modifier Input", "Converted Primary Input" and "Modified Primary Digital Data Output".

Figure 10:
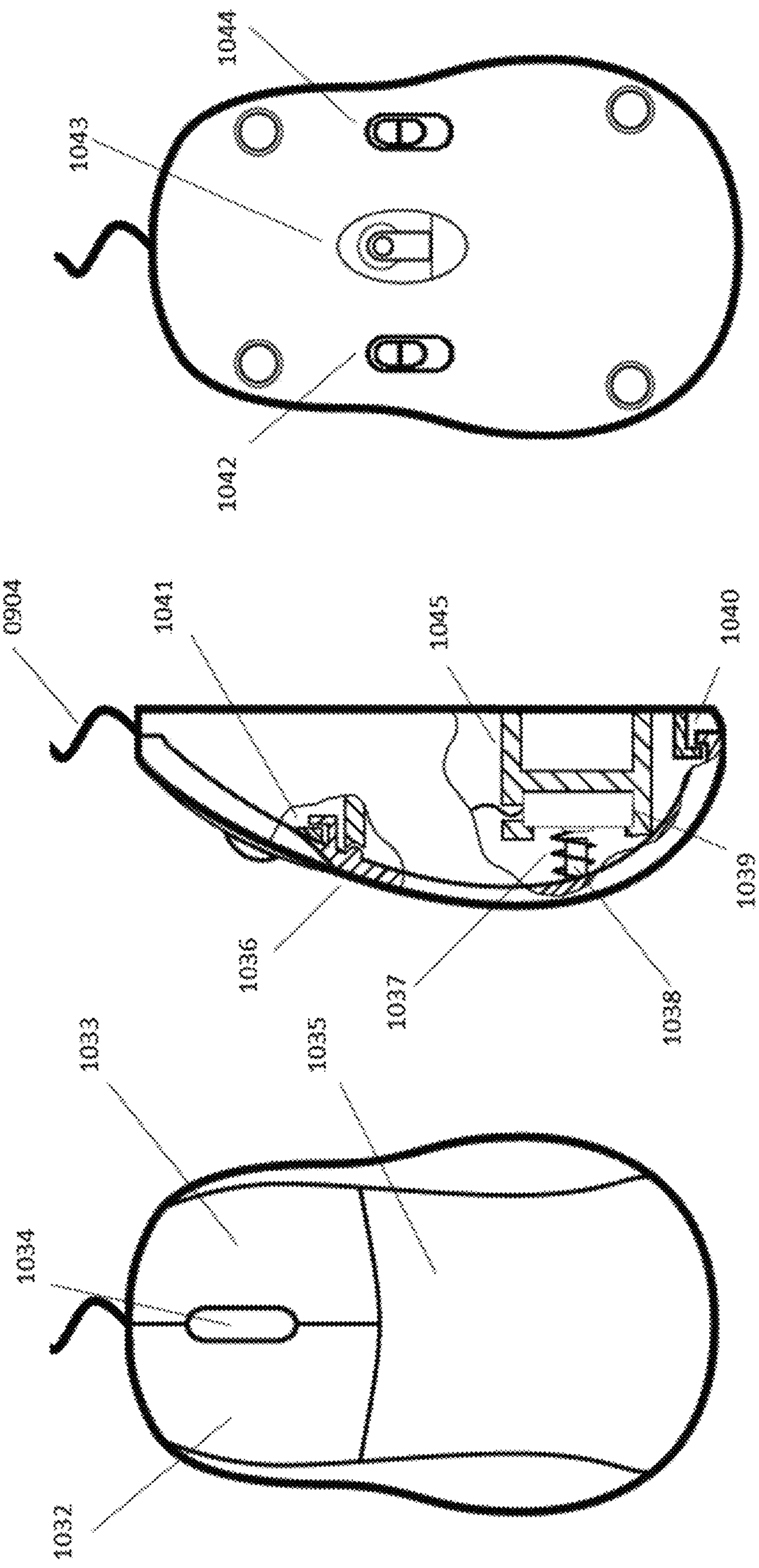
FIG. 10, Embodiment 1 of Optical Mouse with Internal Load Cell (item 0930): This figure depicts an optical mouse equipped with a novel palm button capable of activating the internal load cell resistive sensor.

Optional Components: Optical Mouse with Internal Load Cell and Palm Button (0931): This variant of the mouse has similar functionalities to item 0930 but adds an additional Palm Button for further input. See FIGS. 10 and 11 for details.

Interfacing Cables and Connectivity: Optical Mouse 1/0 Cable (0904) supplies power from the Computer/Game Console (0917) to the mouse and is responsible for data transfer between the two devices.

Computer/Game Console (0917) and Software (0922): The Computer/Game Console (0917) receives and processes digital data from the Optical Mouse (0930/0931) and can also send optional digital data to adjust the mouse's DPI settings. Power to the Optical Mouse is provided via the Optical Mouse 1/0 Cable (0904).

Computer Software (0922) can serve as the central hub for data processing and adjustments to user-defined settings. It processes input data from the Optical Mouse, allowing for real-time adjustments to cursor movements and DPI settings, specifically through integration with the Optical Mouse Internal Load Cell (0928) that detects pressure from the user's palm.

Power Infrastructure: The 120-Volt Outlet Power Cable (0918) & 120 Volt Power Outlet (0919) components supply power to the Computer/Game Console (0917), which in turn powers the Optical Mouse Embodiment 1 of Optical Mouse with Internal Load Cell (0930), FIG. 10

Standard Mouse Buttons (1032, 1033, and 1034) are typical mouse buttons that users have become accustomed to:

Left Mouse Button (1032): Activated by the human finger and produces a digital signal representing a left button click.

Right Mouse Button (1033): Activated by the human finger and produces a digital signal representing a right button click.

Middle Mouse Button/Scroll Wheel (1034): Activated by the human finger and produces a digital signal representing a middle button click or scroll action.

Palm Button System (1035 to 1041): This innovative system introduces a novel input method using the palm of the hand.

The Palm Button ((1035) is designed to transfer the force exerted by the user's palm to the Compression Load Cell Sensor ((1039) through the Palm Button Compression Load Cell Depressor. The Palm Button Spring (1037) provides feedback to the user and returns the button to its neutral position.

The Palm Button Hinge (1036) transforms the linear force from the Palm Button into rotational movement about the hinge.

The Compression Load Cell Sensor (1039) translates the force exerted on it into a variable voltage or digital signal and receives power from the Mouse Microcontroller (0924).

Other Components: These include the Palm Button Spring (1037), Palm Button Compression Load Cell Depressor (1038), and Palm Button Retainers (1040 and 1041), which ensure the proper movement and positioning of the Palm Button. The Load Cell Sensor Mount/Retainer (1045) holds the sensor in a fixed position.

Typical Optical Mouse Items

Mouse Optical Sensor (1043) powered by the microcontroller (0924 see FIG. 9), not shown on graphic but is a common item for the optical mouse, detects the movement of the mouse and sends X and Y coordinates to the microcontroller.

Optical Mouse Input/Output Cable (0904) serves as the main conduit for power from the Computer or Game Console to the Optical Mouse. The cable also facilitates digital data transfer between the Optical Mouse and the Computer or Game Console.

Additional Features: Optional Manual Switch (1042) lets users manually toggle between adjusting cursor speed vs. DPI adjustments. Optional Slider Knob (1044) allows users to adjust the pressure required to activate the Palm Button, offering customization based on user preference.

Figure 11:
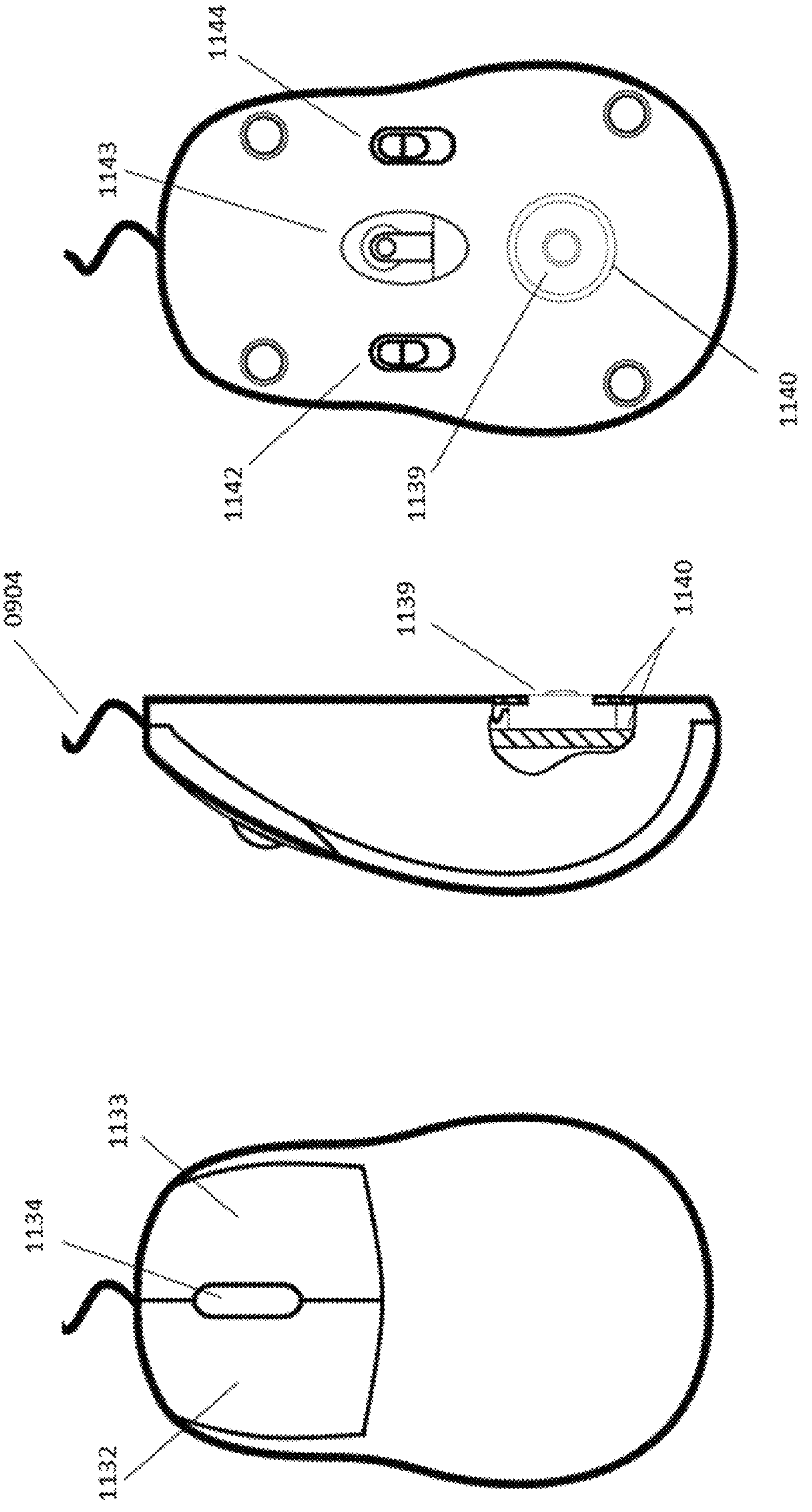
FIG. 11, Embodiment 2, of Optical Mouse with Internal Load Cell (item 0931): This figure illustrates the load cell and its positioning relative to the mouse housing, where the location facilitates easy actuation by user force applied against the mouse through a table or mouse pad.

Embodiment 2, of Optical Mouse with Internal Load Cell (0931), FIG. 11

Typical Mouse Buttons (1132, 1133, and 1134) are typical mouse buttons that users have become accustomed to:

Left Mouse Button (1132): Traditional in function, it's activated by the human finger and emits a digital signal representing a left button click.

Right Mouse Button (1133): Similarly, it's activated by the human finger and sends a digital signal indicating a right button click.

Middle Mouse Button/Scroll Wheel (1134): It's activated by the human finger and produces a digital signal signifying a middle button click or scroll action.

Compression Load Cell and Retainer (1139 and 1140): Compression Load Cell Sensor (1139) is a significant feature of this mouse embodiment; this sensor detects varying pressures applied by the mouse against surfaces like a user's desk or mouse pad. Upon capturing this, it outputs a variable voltage or digital signal reflecting user's applied force. This offers dynamic control of cursor speeds and DPI adjustments. This sensor receives its power from the Mouse Microcontroller (0924). Compression Load Cell Retainer (1140) is designed to counteract the pressures applied on the Load Cell and hold retain the sensor in place, ensuring stability and efficacy.

Typical optical mouse items: Mouse Optical Sensor (1143) powered by the microcontroller (0924 see FIG. 9), not shown on graphic but is a common item for the optical mouse, detects the movement of the mouse and sends X and Y coordinates to the microcontroller.

Optical Mouse Input/Output Cable (0904) serves as the main conduit for power from the Computer or Game Console to the Optical Mouse. The cable also facilitates digital data transfer between the Optical Mouse and the Computer or Game Console.

Additional Control Features: Optional Manual Switch (1142) provides users with the convenience of manually switching between cursor speed and DPI settings. Optional Slider Knob (1144) is a valuable addition for customization, the slider knob lets users adjust the sensitivity of mouse pressure, determining the exact actuation force required.

Figure 12:
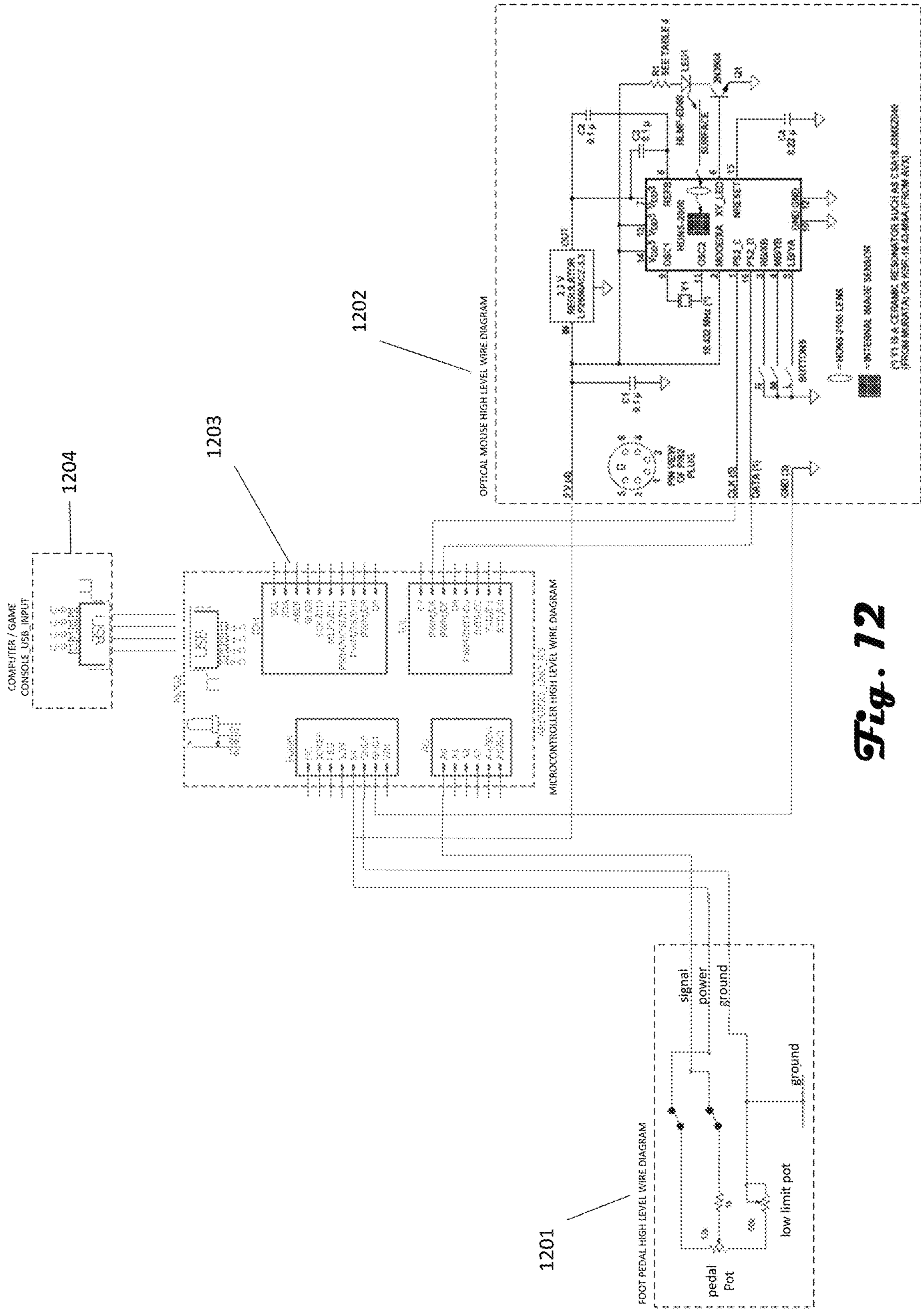
FIG. 12, Integrated Potentiometer Foot Pedal & Mouse Control System High Level Wire Diagram for Embodiment 1: This figure offers a schematic of the electrical circuit for "System Embodiment 1" encompassing the microcontroller and resistive sensors, with a focus on illustrating data flow and signal processing aspects

Integrated Potentiometer Foot Pedal & Mouse Control System High Level Wire Diagram for Embodiment 1, FIG. 12

This system is an innovative integration of a potentiometer foot pedal, optical mouse, and a microcontroller based on the Arduino Uno R3.

The foot pedal, when activated, sends a variable voltage signal to the microcontroller, indicating the desired adjustments to cursor speed or mouse DPI settings.

The optical mouse, on the other hand, functions as a standard input device but has the unique ability to adjust its DPI settings real-time based on instructions from the microcontroller. This dynamic adjustability is influenced by the user's foot pedal input.

Both the foot pedal and the optical mouse derive their power from the microcontroller, which in turn is powered by a computer or game console via a USB connection. Beyond supplying power, the USB connection facilitates bi-directional digital data transfer, allowing the computer to communicate with the microcontroller and vice versa.

In essence, the system enables the user to use the foot pedal to influence mouse settings in real-time, providing an additional layer of control and customization to the traditional mouse experience.

Schematic of Potentiometer Foot Pedal Wire Diagram (1201): The Foot Pedal Wire Diagram (1201) is an electrical schematic outlining the wiring and connectivity of the foot pedal system. This design is powered by a SV supply sourced from the Micro Controller Diagram (1203). Its output primarily comprises a variable voltage signal to "AO" pin of the microcontroller, which is most likely representative of the degree of foot pedal depression or activation. In addition, there's a ground wire which ensures a common ground reference "GND0" pin and is directly linked to the Microcontroller High-Level Wire Diagram (1203).

Schematic of Optical Mouse High Level Wire Diagram (1202): This schematic represents a high-level wiring overview of a typical optical mouse but with certain distinctions. While the mouse derives its SV power from the Micro Controller Diagram (1203) and has a common ground “GRNDI” pin, what’s unique is its configurability. This optical mouse is designed to accept digital data from the microcontroller “D4” and “DS” pin to “Data” and “Clock” pins on mouse respectively, which allow for real-time adjustments of the DPI settings, potentially adapting the sensitivity of the mouse cursor movements.

This mouse functions like a typical optical mouse, but with the added capability to dynamically change its DPI settings based on inputs from the microcontroller.

Schematic of Micro Controller High Level Wire Diagram (1203): This is an electrical schematic of a high-level microcontroller wiring, specifically modeled around the Arduino Uno R3. The microcontroller’s power is derived directly from a Computer/Game Console through its USB input. It interacts with both the Potentiometer Foot Pedal and Optical Mouse diagrams, accepting voltage signals (“AO” pin) and digital data (pins “D4” and “DS”), respectively. Moreover, it sends and receives digital data via its USB connection with the Computer/Game Console. The microcontroller also supplies SV power to both the Potentiometer Foot Pedal and Optical Mouse diagrams. Its primary function is to interpret the foot pedal’s voltage signals (AO) and mouse data (D4 and DS) to adjust cursor speed or the mouse’s DPI settings accordingly.

Schematic of Computer USB Input Diagram (1204): The Schematic of Computer USB Input Diagram (1204) provides a detailed view of a computer’s USB input, primarily designed to manage digital data, specifically standard mouse inputs. Additionally, it supplies power to the Microcontroller (1203) and facilitates bidirectional digital data transfer with the same. This port is crucial for both power supply and data exchange, enabling the Microcontroller (1203) to operate effectively and communicate to produce the final output of cursor movement on the computer.

What is claimed is:

1. A control system for managing and processing signals from a variety of input devices and providing different outputs comprising:

One or more memory devices for storing instructions;

One or more network interface cards;

One or more electronic input devices or peripherals coupled to one or more users for controlling a function or functions in the management computing system, wherein each of the input devices or peripherals optionally comprises:

One or more sensors capable of providing control data, including resistive, capacitive, optical, or magnetic sensors;

An integrated microcontroller for processing input signals locally, while communicating data to the Management Computing System;

Receive information from one or more sensors, peripherals, or external devises in analog or digital format;

Convert analog inputs into digital signals if needed;

Process the information and transmit it via one or more interfaces to the Management Computing System;

Optionally adjust control parameters automatically based on external conditions or algorithmic inputs, including environmental sensing or machine-learning-derived data;

The system further configured to:

The system optionally comprising a power supply for energizing the system, said power supply including but not limited to batteries, power adapters, or variations thereof;

the plurality of electronic input devices includes at least a first electronic input device and a second, separate electronic input device;

the second electronic input device includes a resistive sensor configured to detect user-applied force and generate a modifier input;

and the Management Computing System is configured to adjust an operating parameter of the first electronic input device in real time based on the modifier input received from the second electronic input device.

2. The system of claim 1, wherein each input device is connected to the Management computing system via one or more dedicated one directional or bi directional data transmission means such as cables, physical wired connection, optical and/or wireless communication, including but not limited to USB, Wi-Fi, Bluetooth, or infrared among others.

3. The system of claim 2, wherein the Management Computing System dynamically adjusts settings and control parameters for each connected input device, peripheral or external device based on user inputs or automatic sensing, environmental data, or algorithmic processing.

4. The system of claim 3, further comprising a user interface configured to dynamically modify settings and control parameters for each input device, peripheral or external device including but not limited to DPI, cursor speed, resolution, haptic feedback, robotic control, or virtual/augmented reality parameters.

5. The system of claim 4, wherein the Management Computing System optimizes interactions across the connected input devices, peripherals and external devices, using real-time feedback or algorithmic data to adjust control parameters for various usage scenarios, including but not limited to the recognition of distinct patterns or sequences from input devices as specific commands or gestures.

6. The system of claim 5, wherein the plurality of electronic input devices coupled to the user include but are not limited to one or more of the following: an optical mouse, a keyboard, a joystick, a touch screen, a load cell button, a haptic feedback device, a voice recognition system, a neural interface, an augmented reality (AR) or virtual reality (VR) peripheral, a wearable device, a gesture recognition device, an audio interface for merging or transitioning between different music genres and variations or equivalents thereof.

7. The system in claim 6, wherein some of the input devices include resistive sensors, and the system further comprises software for adjusting how each resistive sensor interacts with control parameters and settings.

8. The system in claim 6, wherein the Management Computing System is further configured to manage inputs from one or multiple input devices, including but not limited to potentiometer foot pedals and adjust settings and output parameters based on user’s force input, including but not limited to cursor speed, DPI adjustment, audio, or haptic feedback, AR/VR peripherals, wearable devices.

9. The system of claim 6, wherein some of the input devices include a load cell capable of detecting varying pressures applied by the user, allowing for dynamic interaction modalities that adjust control parameters, such as cursor speed and DPI settings, in real time.

10. The system of claim 9 wherein some of the input devices include a load cell capable of detecting varying pressures applied by the user, allowing for dynamic interaction modalities that adjust control parameters such as but not limited to cursor speed and DPI settings in real time.

11. The system of claim 10 wherein the load cell’s sensitivity and response to applied pressure can be adjusted through software or manual controls, providing real-time feedback and enabling the recognition of distinct pressure patterns or gestures as specific commands.

* * * * *